Figure 1:
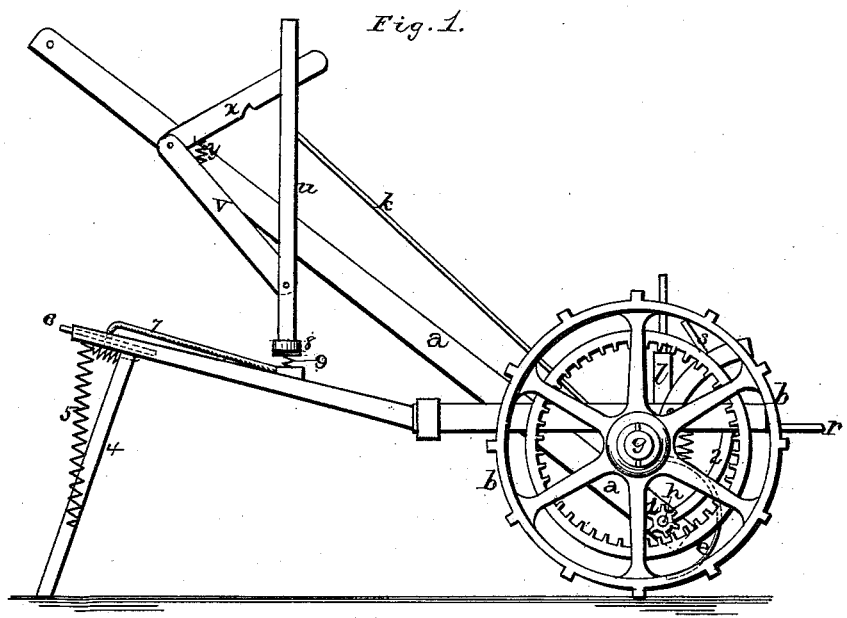
Figure 2:
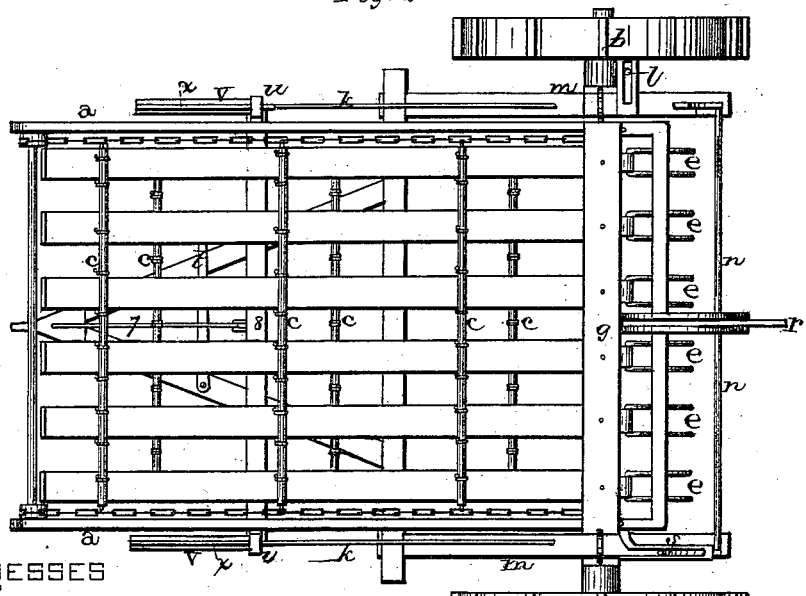

2 Sheets—Sheet 1.

H. F. SMITH.
HAY RAKE AND LOADER.

No. 192,298. Patented June 19, 1877.

WITNESSES

INVENTOR

N. PETERS, PHOTO-LITHOGRAPHER, WASHINGTON, D. C.

2 Sheets—Sheet 2.
H. F. SMITH.
HAY RAKE AND LOADER.
No. 192,298. Patented June 19, 1877.
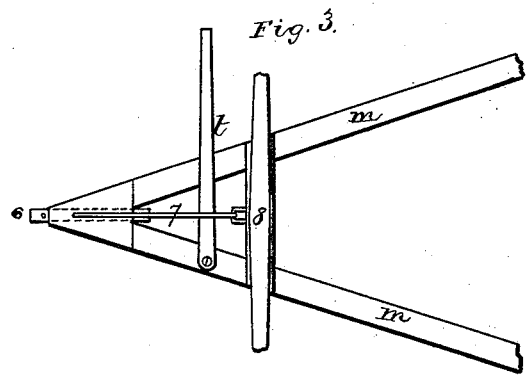
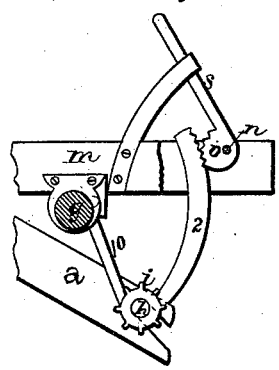
WITNESSES
INVENTOR

UNITED STATES PATENT OFFICE.

HIRAM F. SMITH, OF RICHMOND, MICHIGAN.

IMPROVEMENT IN HAY RAKE AND LOADER.

Specification forming part of Letters Patent No. 192,298, dated June 19, 1877; application filed May 19, 1877.

*To all whom it may concern:*

Be it known that I, HIRAM F. SMITH, of Richmond, in county of Macomb and State of Michigan, have invented certain new and useful Improvements in Hay-Loader; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rake and loader; and it consists in the arrangement and combination of parts that will be more fully described hereinafter, whereby hay is raked and loaded upon the wagon without any manual labor.

The accompanying drawings represent my invention.

*a* represents a frame, which is supported upon two driving-wheels, *b*, and which has the endless carrier *c* passing up over it for the purpose of carrying up the hay, which is raked from the ground by means of the rake-teeth *e*, that are secured to the rear side of the axle *g*. These rake-teeth are made of metal, and have coiled springs bearing down upon their tops, so that they can give in case of striking any obstruction that may be in their way. By means of the lever *r* these teeth can be raised above or lowered down to the ground, as may be desired. Passing through the lower end of the frame *a* is the shaft *h*, which has two or more pinions, *i*, secured to it for the purpose of operating the carrier, and a pinion, 1, upon one end, which meshes with the cogs on the inside of one of the driving-wheels. Attached to one end of this shaft *h* is the lever *l*, by means of which the shaft can be moved endwise, so as to throw the pinion 1 in and out of gear with the cogs on the side of the wheel, and thereby cause the carrier to be operated or stand still whenever desired. Secured to the top of the axle is the rectangular frame *m*, the rear end of which projects some distance in the rear of the axle. Journaled in the rear ends of this frame *m* is the shaft *n*, which has a matching gear secured to each of its ends. These gears mesh with the teeth of the segmental racks 2, which pass up through the rear ends of the frame, and have their lower ends fastened to the shaft *h*. These segmental racks form parts of the links or hangers 10, which have their upper ends pivoted upon the axle *g*, as shown in Fig. 4, and which have the shaft *h* journaled in their lower ends. As this shaft *h* passes through and supports the lower end of the frame *a*, it is evident that when the segmental racks are moved the whole lower end of the frame *a* moves with them, and this motion will be concentric to the axle, and accordingly to the main gear-wheel, the upper end of the frame being supported upon pivot-points, as will be more fully described hereinafter, so as to allow this movement. By turning this shaft *n* by means of its lever *s* the lower end of the frame *a* can be raised and lowered at will, so as to bring the carrier nearer to or farther from the rake-teeth. The front end of the frame *m* is supported by the support 4, which is pivoted to the under side of the front end of the frame, and which has the coiled or other suitable springs 5 attached to it. In case this support should strike against an obstruction as the loader is being moved forward, it will give before it, so that the support will not be injured or the progress of the loader impeded.

In the extreme front end of the frame *m* is made a suitable hole or opening, into which is thrust the clevis 6, for attaching the loader to the wagon that is being loaded with the hay. This clevis is held in position by means of the spring-rod 7, which has its front end bent at right angles, so as to pass down through the clevis. By pushing back upon the lever *t* that is pivoted upon the front end of the frame *m* this spring-rod is raised upward sufficiently far to cause its front end to release the clevis. As soon as the lever is moved forward again the spring-rod at once snaps back into position. Upon the top of the frame *m*, near its front end, is placed the cross-beam 8, which rests upon the two spiral springs 9, that are placed around the bent rod or other device which holds the beam in positon. Projecting upward from each end of this cross-beam is a standard, *u*, which is braced in position by means of the rods *k*. Pivoted in a mortise at the lower end of each standard is a beam, *v*, the upper end of which beam is pivoted to the side of the frame $a$ near its upper end. Pivoted in the upper ends of these beams $v$ are the notched levers $x$, the upper ends of which pass through mortises in the upper ends of the standards. Placed between the beams and the notched levers, so as to unite them together at any suitable point, and keep the levers pressed downward, so as to cause the notches to catch on the standards, are the springs $y$. By raising up and down these levers the upper ends of the frame $a$ may be raised and lowered at will, so as to accommodate the upper end of the frame to the height of the wagon and the load upon it.

After the hay has been cut it is only necessary to attach my combined loader and raker to the rear end of a wagon and then draw the wagon over the field, when the hay will be raked and loaded upon the wagon without any other manual labor than to adjust the parts of the loader to the work that is required of them.

Having thus described my invention, I claim—

1. The combination of the frame $a$, hinged or pivoted at its upper end, frame $m$, shaft $h$, hanger 10, segmental rack 2, matching gear $o$, and lever $s$, whereby the lower end of the frame $a$ can be moved nearer to or farther from the rake-teeth, substantially as shown.

2. The combination of the frame $m$, cross-beam 8, springs 9, standards $u$, beams $v$, levers $x$, and springs $y$, substantially as specified.

In testimony that I claim the foregoing I have hereunto set my hand this 9th day of May, 1877.

HIRAM F. SMITH.

Witnesses:
 THOS. McDONOUGH,
 ISAAC ROBERTS.